United States Patent [19]

Eling et al.

[11] Patent Number: 4,771,025

[45] Date of Patent: Sep. 13, 1988

[54] CATALYST SYSTEMS FOR THE PREPARATION OF FOAMS CONTAINING ISOCYANURATE AND URETHANE LINKAGES

[75] Inventors: Berend Eling, Wezembeek-Oppem; Anthony Cunningham, Bertem; Chris Debien, Erps-Kwerps, all of Belgium

[73] Assignee: Imperial Chemical Industries PLC, London, England

[21] Appl. No.: 16,888

[22] Filed: Dec. 18, 1986

[30] Foreign Application Priority Data

Dec. 18, 1985 [GB] United Kingdom ................ 8531180

[51] Int. Cl.$^4$ .............................................. B01J 31/04
[52] U.S. Cl. ................................... 502/164; 502/170; 521/128

[58] Field of Search ................ 502/164, 170; 521/128

[56] References Cited

U.S. PATENT DOCUMENTS

| | | | |
|---|---|---|---|
| 3,349,638 | 9/1982 | Narayan | 521/125 |
| 4,200,699 | 4/1980 | Treadwell | 502/170 |
| 4,582,861 | 4/1986 | Galla et al. | 502/164 X |

*Primary Examiner*—Patrick P. Garvin
*Assistant Examiner*—George R. Fourson
*Attorney, Agent, or Firm*—Cushman, Darby & Cushman

[57] ABSTRACT

A catalyst system useful in the preparation of rigid foams containing urethane and isocyanurate groups comprises an alkali metal or tertraalkyl ammonium carboxylate, a group IIA metal carboxylate and, optionally, an amine co-catalyst.

7 Claims, No Drawings

CATALYST SYSTEMS FOR THE PREPARATION OF FOAMS CONTAINING ISOCYANURATE AND URETHANE LINKAGES

FIELD OF THE INVENTION

The invention relates to the preparation of polymer foams containing urethane and isocyanurate groups and is more particularly concerned with the use of novel catalyst combinations in the foaming reaction.

DESCRIPTION OF THE PRIOR ART

Rigid foams containing isocyanurate and/or urethane linkages are known in the art. The prior art discloses methods for preparing foams by reacting an organic polyisocyanate with a polyol in a polyisocyanate to polyol equivalent ratio (i.e. "isocyanate index") above 150 in the presence of a blowing agent using a catalyst system to provide foams with isocyanurate groups. The foams are useful materials with good fire resistance properties.

In the manufacture of these foams containing both urethane and isocyanurate linkages, the rate of rise of the foam is generally less smooth than is desirable, two distinct rates often being observed. It is believed that the existence of a strong second rise is responsible for the occurrence of structural defects in continuous foam laminates produced under certain conditions. These defects are known in the trade as 'shear layers' and 'gull's wings' and can give rise to inferior mechanical properties.

The use of lower catalyst levels can reduce the problem to some extent, giving a smoother rise profile, but the rate of cure of the foam can then be unacceptably slow.

Catalyst combinations for the trimerisation of polyisocyanurate have already been described. For example, UK patent No. 1,534,236 describes a system in which the reactivity is adjusted by the addition of small quantities of acid, caprolactam and 2,4 pentadione. U.S. Pat. No. 4,003,859 discloses a combination of a tertiary amine, an alkali metal salt of a N-substituted amid-e and a dibutyl tin di(alkanoate). U.S. Pat. No. 4,011,180 discloses a combination of an alkali metal salt of a N-substituted amide and an alkali metal salt of N-(2-hydroxyphenyl) methyl glycine.

A catalyst combination has now been found which gives an unexpectedly smooth profile and still a sufficient cure and is therefore useful in the preparation of isocyanurate foam slabstocks, press-panels and laminates, especially those which are continuously made.

Accordingly, the invention provides a catalyst system for the production of a foam containing urethane and isocyanurate linkages the system comprising:

(1) an alkali metal or tetralkylammonium carboxylate having the formula

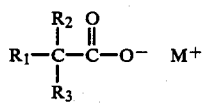

and (2) a group IIa metal or zinc carboxylate having the formula

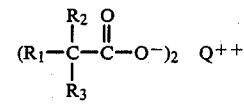

wherein M represents an alkali metal or tetralkylammonium, Q represents a Group IIa metal, $R_1$, $R_2$ and $R_3$ are the same or different and represent H or lower alkyl, cycloaklyl, phenyl or alkylphenyl.

The two carboxylates may be derived from the same acid or may be different. A mixture of different alkali metal or tetralkylammonium carboxylates of formula 1 and/or a mixture of different group IIa metal carboxylates of formula 2 may also be used.

The term 'lower alkyl' means an alkyl group, branched or straight, having from 1 to 12 carbon atoms.

In both chemical compounds, $R_1$ is preferably selected from H and methyl, $R_2$ from H, methyl and ethyl, and $R_3$ from methyl, ethyl, isopropyl, butyl and cyclohexyl. Most preferably $R_1$ is H, $R_2$ is $C_2H_5$ and $R_3$ is $C_4H_9$. However, in the selection of the acids, care has to be taken that a combinaticn of the salts in the foam recipe still gives a stable solution i.e. that no species are formed which precipitate from the reaction mixture. Under some circumstances this may be the case for the acetate, proprionate, oleate and stearate salts.

The alkali metal salt is preferably a potassium salt but this may be fully or partially replaced by the corresponding sodium, rubidium or cesium salt. A suitable tetraalkyl ammonium salt is tetrabutyl ammonium salt. Other ammonium salts susceptible to promote the polyisocyanate trimerisation are disclosed in U.S. Pat. Nos. 4,186,255, 3,954,684 and 3,980,594. The group IIa salt is preferably a calcium or strontium salt but may be a barium, magnesium or zinc salt.

Suitable acids include for example hexanoic acid, 2-methyl hexanoic acid, 2-ethylhexanoic acid, cyclohexyl-acetic acid, trimethyl acetic acid, iso valeric acid and butyric acid.

The present invention additionally provides a process for the preparation of a cellular foam characterised by urethane and isocynurate linkages, particularly in the formation of continuously produced laminates which comprises reacting an organic polyisocyanate and a minor proportion of a polyol in a polyisocyanate to polyol equivalent ratio (i.e. "isocyanate index") above 150 in the presence of a blowing agent and a catalytically sufficient amount of a catalyst system as recited above.

The catalysts of this invention which are useful in the preparation of rigid foams comprising isocyanurate and urethane groups may be prepared as follows:

(1) The alkali metal carboxylate, as for example potassium 2-ethyl hexanoate, can be prepared from the alkali hydroxide and the corresponding carboxylic acid. As a diluent of the catalyst several glycols can be used such as a monoethylene glycol, diethylene glycol and higher polyethyleneoxides (molecular weight preferably below 600). Polypropyleneoxides (molecular weight preferably below 3000) are also suitable diluents.

(2) The group IIa dicarboxylates, preferably calcium 2-ethyl hexanoate can be prepared from metal hydroxide or oxide and the corresponding carboxylic acid. As a diluent it is preferred to select polypropylene oxide or polyethyleneoxide, preferably with a molecular weight between 200 and 3000, but also ethoxylated nonylphenol can be used.

The catalyst combinations described hereinabove specifically require the use of the two catalyst components in combination. Preferably these two catalyst components are used in a ratio of alkali metal or tetralkylammonium carboxylate to group IIa metal carboxylate ranging from 30:1 to 1:1.

In addition to these required catalyst components, other catalysts may be used in carrying out the invention, as for instance tertiary amines, for example triethylene diamine, or other trimerisation catalysts known in the art may be used in conjunction with the above catalyst combination, provided that no precipitation of the co-catalyst system occurs. Such trimerisation catalyst include tertiary amines, for example cyclohexyl dimethyl amine or tetraethylene diamine, or phospholene derivatives. Also commonly used flow modifiers like free acids may be used in conjunction with the described catalys combination.

The polyols used in the preparation of the foam containing urethane and isocyanurate groups in accordance with the present invention may be any of those known in the art to be useful as a component in the preparation of foams containing urethane and isocyanurate goups. Preferred polyols are polyether polyols and polyester polyols having 2 to 8 OH-groups per molecule and hydroxyl values in the range of 50 to 1200 mg KOH/g. Suitable polyester polyols are advantageously obtained by condensation polymerisation of dicarboxylic acids with glycols, such as adipic acid with diethylene glycol, phthalic anhydride with glycol and other diacids and glycols conventional in the art, possibly in the presence of polyols and/or polyacids of higher functionality, and by depolymerisation of polyesters such as polyethyleneterephthalate in the presence of glycol. Suitable polyethers are advantageously obtained by addition of propylene oxide and/or ethylene oxide to poly functional alcohol or amine starter materials.

Also the polyisocyanates employed can be any of the organic polyisocyanates conventionally employed. Preferred polyisocyanates are diphenyl methane diisocyanates, polyphenyl polymethylene polyisocyanate and toluene polyisocyanates and mixtures thereof. Foaming agents and other optional additives such as dispersing agents, cell stabilisers, surfactants, flame retardants and the like can be employed as required. In manufacturing the foams in accordance with the process of the invention, the procedure and equipment conventional in the art are employed.

The amount of alkali metal salt used per hundred grams of total reaction mixture can be varied in concentration of between $1.0 \times 10^{-3}$ and $1 \times 10^{-2}$ mol and the amount of group IIa metal salt may be varied preferably between $5 \times 10^{-5}$ and $4 \times 10^{-3}$ mol. When a tertiary amine is optionally present, levels between $5 \times 10^{-4}$ and $1 \times 10^{-2}$ mol of said amine are preferred.

The following are specific, non limiting example's which are provided to illustrate the principles described herein. The amounts given in the experiments and tables are parts by weight.

Rate of rise determination

A fixed amount of 50 grams total reaction mixture is stirred at a rate of 2000 rpm for 6 sec. in a paper cup and then the height of the rising foam is measured as a function of time. After this measurement the real height is normalised such that the final height of the foam equals one. Then the obtained curve is differentiated with respect to time. From the obtained plots two seperate reaction rates can be clearly discerned.

Rigid foams were prepared using the products stated in the examples and catalyst combinations of an alkali or ammonium carboxylate and an earth alkaline carboxylate in accordance with the invention. The rise profiles of the foam recipies were recorded according to the described technique and the rate of the first (r1) and the second rise (r2) as well as the gel time were determined.

The catalyst levels were chosen such that the gel time had substantially the same value of approximately 55 seconds in all experiments. The "smoothness" of the rise profile can thus be linked directly to the value of the second rise rate. In order to demonstrate the claimed effect, a series of experiments were performed with potassium or tetrabutylammonium carboxylate alone and with various levels of different earth alkaline and zinc carboxylates. The added catalytic salts were diluted in a carrier of a reactive type, having a small influence on the isocyanate index.

EXAMPLES

Example 1

In this example (experiments 1–3) the effect of Mg-2-ethylhexanoate on the action of K-2-ethylhexanoate is demonstrated in the reaction of a polyester polyol and polymeric MDI. The potassium salt is diluted in polypropylene glycol with a molecular weight of 400 (comp. 1) in a 1/1 weight to weight ratio (hydroxyl value of catalyst blend=140 mg KOH/g and the amount of catalytic species amounts 2.75 mmol/g) and the magnesium salt is diluted in polypropylene glycol with a molecular weight of 200 (comp. 2) in a ½ ratio (hydroxyl value of catalyst blend=373 mg KOH/g and the amount of catalytic species amounts 1.08 mmol/g).

| Ingredient | Experiment | | |
| --- | --- | --- | --- |
|  | 1 | 2 | 3 |
| polyester polyol (a) | 23 | 23 | 23 |
| tris (2-chloroethyl-) phosphate | 6 | 6 | 6 |
| surfactant DC193 (b) | 1 | 1 | 1 |
| trichlorofluoromethane | 12 | 12 | 1 |
| component 1 | 1.20 | 1.20 | 1.15 |
| component 2 | — | 0.15 | 0.90 |
| polyisocyanate (c) | 56.5 | 56.5 | 56.5 |
| molar ratio isocyanate/hydroxyl groups | 387 | 386 | 369 |
| gel time (s) | 53 | 56 | 55 |
| $r_1$ ($10^2$ $s^{-1}$) | 3.1 | 2.3 | 1.8 |
| $r_2$ ($10^2$ $s^{-1}$) | 6.0 | 5.0 | 4.1 |

(a) A low functionality polyester polyol with hydroxyl value 250 mg KOH/g supplied by ICI under the trade name PBA 5513
(b) A silicone surfactant sold by Dow Corning Corporation
(c) A crude diphenyl methane diisocyanate supplied by ICI under the trade name Suprasec 5005.

Example 2

In this example (experiments 1–3) the effect of Ca-2-ethylhexanoate is demonstrated on the action of K-2-ethylhexanoate (component 1). The calcium salt is diluted in polypropylene glycol with a molecular weight of 400 (comp. 3) 1 in a ⅜ weight to weight ratio (hydroxyl value of catalyst blend=168 mg KOH/g and the number of catalytic species amounts 1.23 mmol/g).

| Ingredient | Experiment | | |
|---|---|---|---|
| | 1 | 2 | 3 |
| polyester polyol (a) | 23 | 23 | 23 |
| tris (2-chloroethyl-) phosphate | 6 | 6 | 6 |
| surfactant DC193 (b) | 1 | 1 | 1 |
| trichlorofluoromethane | 12 | 12 | 12 |
| component 1 | 1.20 | 1.24 | 1.50 |
| component 3 | — | 0.20 | 1.20 |
| polyisocyanate (c) | 56.5 | 56.5 | 56.5 |
| molar ratio isocyanate/hydroxyl groups | 387 | 384 | 369 |
| gel time (s) | 53 | 55 | 53 |
| $r_1$ ($10^2$ S$^{-1}$) | 3.1 | 2.8 | 2.5 |
| $r_2$ ($10^2$ S$^{-1}$) | 6.0 | 5.3 | 3.4 |

Example 3

In this example (experiments 1-3) the effect of Sr-2-ethylhexanoate is demonstrated on the action of K-2-ethylhexanoate (component 1). The strontium salt is diluted in polypropylene glycol with a molecular weight of 200 (comp. 4) in a ⅔ weight ratio (hydroxyl value of catalyst blend=337 mg KOH/g and the number of catalytic species amounts 1.07 mmol/g).

| Ingredient | Experiment | | |
|---|---|---|---|
| | 1 | 2 | 3 |
| polyester polyol (a) | 23 | 23 | 23 |
| tris (2-chloroethyl-) phosphate | 6 | 6 | 6 |
| surfactant DC193 (b) | 1 | 1 | 1 |
| trichlorofluoromethane | 12 | 12 | 12 |
| component 1 | 1.20 | 1.30 | 1.60 |
| component 4 | — | 0.2 | 1.20 |
| polyisocyanate (c) | 56.5 | 56.5 | 56.5 |
| molar ratio isocyanate/hydroxyl groups | 387 | 381 | 361 |
| gel time (s) | 53 | 53 | 58 |
| $r_1$ ($10^2$ S$^{-1}$) | 3.1 | 3.0 | 2.5 |
| $r_2$ ($10^2$ S$^{-1}$) | 6.0 | 5.2 | 3.1 |

Example 4

In this example (experiments 1-3) the effect of ba-2-ethylhexanoate is demonstrated on the action of K-2-ethylhexanoate (component 1). The barium salt is diluted in Renex 467 which is an oxyethylated nonyl phenol (Atlas) (comp. 5) in a 1/1 weight ratio (hydroxyl value of catalyst blend=40 mg KOH/g and the number of catalytic species amounts 1.18 mmol/g).

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 1 | 1.20 | 1.20 | 1.35 |
| component 5 | — | 0.15 | 1.00 |
| polyisocyanate (c) | 56.5 | 56.5 | 56.5 |
| molar ratio isocyanate/hydroxyl groups | 387 | 387 | 383 |
| gel time (s) | 53 | 53 | 57 |
| $r_1$ ($10^2$ S$^{-1}$) | 3.1 | 2.8 | 2.4 |
| $r_2$ ($10^2$ S$^{-1}$) | 6.0 | 5.2 | 3.8 |

Example 5

In this example (experiments 1-3) the effect of Zn-2-ethylhexanoate is demonstrated on the action of K-2-ethylhexanoate (component 1). The Zn salt is diluted in Renex 647 (comp 6) in a ⅔ weight ratio (hydroxyl value of the total blend=50 mg KOH/g and the number of catalytic species amounts 1.11 mmol/g).

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 1 | 1.20 | 1.20 | 1.50 |
| component 6 | — | 0.30 | 0.80 |
| polyisocyanate (c) | 56.5 | 56.5 | 56.5 |
| molar ratio isocyanate/hydroxyl groups | 387 | 380 | 372 |
| gel time (s) | 53 | 57 | 54 |
| $r_1$ ($10^2$ S$^{-1}$) | 3.1 | 2.3 | 2.1 |
| $r_2$ ($10^2$ S$^{-1}$) | 6.0 | 4.9 | 3.5 |

Example 6

In this example (experiments 1-2) the effect of Ca-2-ethylhexanoate (comp. 3) is demonstrated on the action of tetrabutylammonium-2-ethylhexanoate. The ammonium salt is dilluted in PPG 400 (comp. 7) in a ⅔ weight ratio (hydroxyl value of catalyst blend=170 mg KOH/g and the amount of catalytic species amounts 1.03 mmol/g).

| Ingredient | Experiment | |
|---|---|---|
| | 1 | 2 |
| polyester polyol (a) | 23 | 23 |
| tris (2 chloroethyl-) phosphate | 6 | 6 |
| surfactants DC193 (b) | 1 | 1 |
| trichlorofluoromethane | 12 | 12 |
| component 7 | 1.50 | 1.80 |
| component 3 | — | 2.0 |
| polyisocyanate (c) | 56.5 | 56.5 |
| molar ratio isocyanate/hydroxyl groups | 385 | 363 |
| gel time (s) | 57 | 56 |
| $r_1$ ($10^2$ S$^{-1}$) | 2.0 | 1.6 |
| $r_2$ ($10^2$ S$^{-1}$) | 4.9 | 4.2 |

Examples 7-10

In the following examples 7 to 10 various carboxylates ie trimethyl acetate, cyclohexylacetate, isovalerate and rutyrate are used for catalyst combinations in accordance with the invention and compared to the potassium carboxylate used alone.

Example 7

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 8 | 1.25 | 1.40 | 1.80 |
| component 9 | — | 0.50 | 2.0 |
| polyisocyanate (c) | 56.5 | 56.5 | 56.5 |

-continued

| Ingredient | Experiment | | |
|---|---|---|---|
| | 1 | 2 | 3 |
| molar ratio isocyanate/hydroxyl groups | 365 | 350 | 310 |
| gel time (s) | 54 | 53 | 56 |
| $r_1$ ($10^2$ $s^{-1}$) | 2.5 | 2.5 | 2.4 |
| $r_2$ ($10^2$ $s^{-1}$) | 3.7 | 3.3 | 2.5 |

Component 8 is K-trimethylacetate diluted in polyethylene glycol with a molecular weight of 200 in a ¼ weight ratio (hydroxyl value of catalyst blend=448 mg KOH/g, amount of catalytic species amounts 1.43 mmol/g).

Component 9 is Ca-trimethylacetate diluted in polypropylene glycol with a molecular weight of 200 in a ¼ weight ratio (hydroxyl value of catalyst blend=448 mg KOH/g, amount of catalYtic species amounts 0.826 mmol/g).

Example 8

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 10 | 2.30 | 2.40 | 2.86 |
| component 11 | — | 0.50 | 1.00 |
| polyisocyanate (c) | 56.5 | 56.5 | 56.5 |
| molar ratio isocyanate/hydroxyl groups | 390 | 388 | 385 |
| gel time (s) | 57 | 57 | 55 |
| $r_1$ ($10^2$ $s^{-1}$) | 1.5 | 1.8 | 1.9 |
| $r_2$ ($10^2$ $s^{-1}$) | 3.7 | 3.4 | 3.3 |

Component 10 is K-cyclohexylacetate diluted in Renex 647 (ie ethoxylated nonyl phenol) in a ¼ weight ratio (hydroxyl value of catalyst blend=70 mg KOH/g, amount of catalytic species amounts 1.10 mmol/g).

Component 11 is Ca-cyclohexylacetate diluted in Renex 647 in a ¼ weight ratio (hydroxyl value of catalyst blend=70 mg KOH/g, amount of catalytic species amounts 0.62 mmol/g).

Example 9

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 12 | 1.73 | 1.75 | 2.10 |
| component 13 | — | 0.50 | 4.00 |
| polyisocyanate (c) | 56.5 | 56.5 | 56.5 |
| molar ratio isocyanate/hydroxyl groups | 356 | 354 | 334 |
| gel time (s) | 55 | 57 | 56 |
| $r_1$ ($10^2$ $s^{-1}$) | 2.0 | 1.8 | 1.8 |
| $r_2$ ($10^2$ $s^{-1}$) | 4.7 | 4.1 | 3.1 |

Component 12 is K-isovalerate diluted in polyethylene oxide with a molecular weight of 200 in a ¼ weight ratio (hydroxyl value of catalyst blend=448 mg KOH/g and the amount of catalytic species=1.79 mmol/g).

Component 13 is Ca-isovalerate diluted in Renex 647 in a ¼ weight ratio (hydroxyl value of catalyst blend=70 mg KOH/g, amount of catalytic species=0.83 mmol/g).

Example 10

| Ingredient | Experiment | | |
|---|---|---|---|
| | 1 | 2 | 3 |
| polyester polyol (a) | 23 | 23 | 23 |
| tris (2 chloroethyl-) phosphate | 6 | 6 | 6 |
| surfactant DC193 (b) | 1 | 1 | 1 |
| trichlorofluoromethane | 12 | 12 | 12 |
| component 14 | 1.55 | 1.55 | 1.57 |
| component 15 | — | 0.50 | 2.00 |
| polyisocyanate (c) | 56.5 | 56.5 | 56.5 |
| molar ratio isocyanate/hydroxyl groups | 360 | 346 | 314 |
| gel time (s) | 55 | 54 | 53 |
| $r_1$ ($10^2$ $s^{-1}$) | 2.6 | 2.2 | 2.4 |
| $r_2$ ($10^2$ $s^{-1}$) | 5.5 | 2.5 | 4.0 |

Component 14 is K-butyric acid diluted with polyethylene glycol with a molecular weight of 200 in a ¼ weight ratio (hydroxyl value of catalyst blend=448 mg KOH/g, amount of catalytic species=1.59 mmol/g).

Component 15 is Ca-butyrate diluted with polyethylene glycol with a molecular weight of 200 in a ¼ weight ratio (hydroxyl value of catalyst blend=448 mg KOH/g, amount of catalytic species=0.93 mmol/g).

We claim:

1. A catalyst system for the formation of foams containing urethane and isocyanurate groups which comprises
   (1) an alkali metal or tetraalkyl ammonium carboxylate having the formula

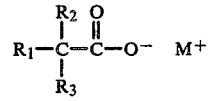

and
   (2) a group IIa metal carboxylate having the formula

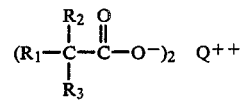

wherein M represents an alkali metal or tetraalkylammonium, Q represents a Group IIa metal, $R_1$, $R_2$ and $R_3$ are the same or different and represent H or lower alkyl, cycloalkyl, phenyl or alkylphenyl.

2. A catalyst system according to claim 1 wherein M is selected from potassium and tetrabutylammonium.

3. A catalyst system according to claim 1 or 2 wherein Q is selected from the group consisting of magnesium, calcium, strontium and barium.

4. A catalyst system according to claim 3 wherein the molar ratio of alkali metal carboxylate or tetralkyl ammonium carboxylate to group IIa metal carboxylate ranges from 30:1 to 1:1.

5. A catalyst system according to claim 3 wherein $R_1$ is selected from the group consisting of H and methyl, $R_2$ from the group consisting of H, methyl and ethyl and $R_3$ from the group consisting of methyl, ethyl, isopropyl, butyl and cyclohexyl.

6. A catalyst system according to claim 3 wherein $R_1$ is H, $R_2$ is $C_2H_5$ and $R_3$ is $C_4H_9$.

7. A catalyst system according to claim 3 further comprising an amine co-catalyst.

* * * * *